(No Model.) 2 Sheets—Sheet 1.
W. PAGE.
TWO WHEELED VEHICLE.
No. 404,496. Patented June 4, 1889.
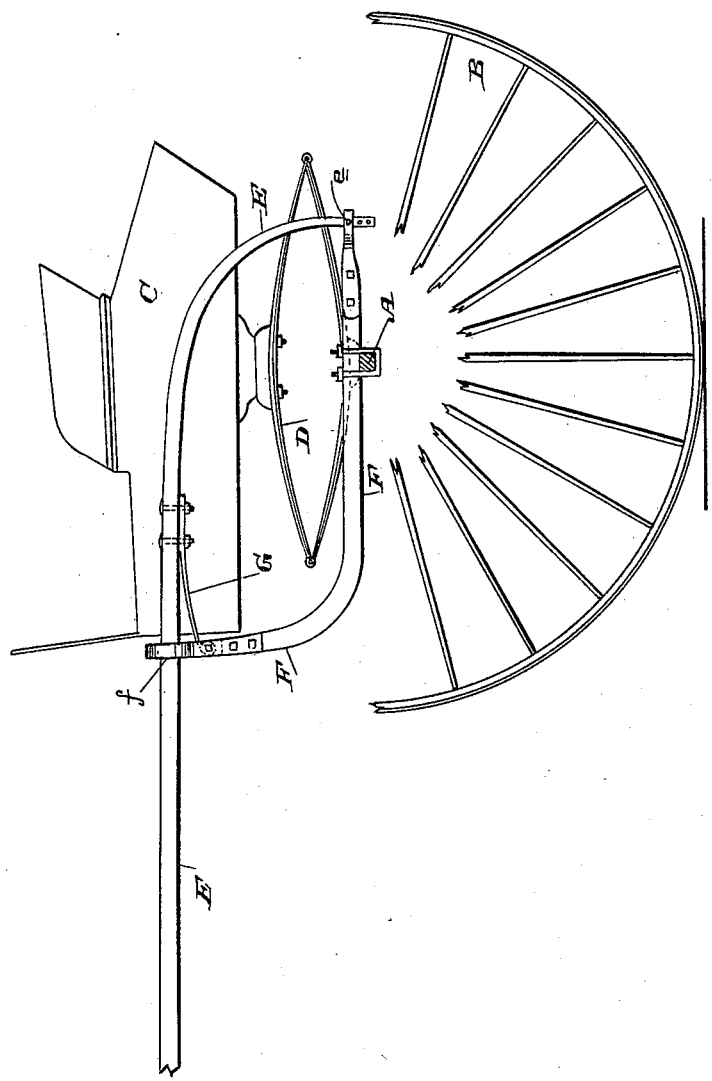
Witnesses,
Geo. H. Strong.
J. H. Rouse
Inventor,
Wilfred Page
By Dewey & Co.
attys (No Model.)  2 Sheets—Sheet 2.
W. PAGE.
TWO WHEELED VEHICLE.
No. 404,496.  Patented June 4, 1889.
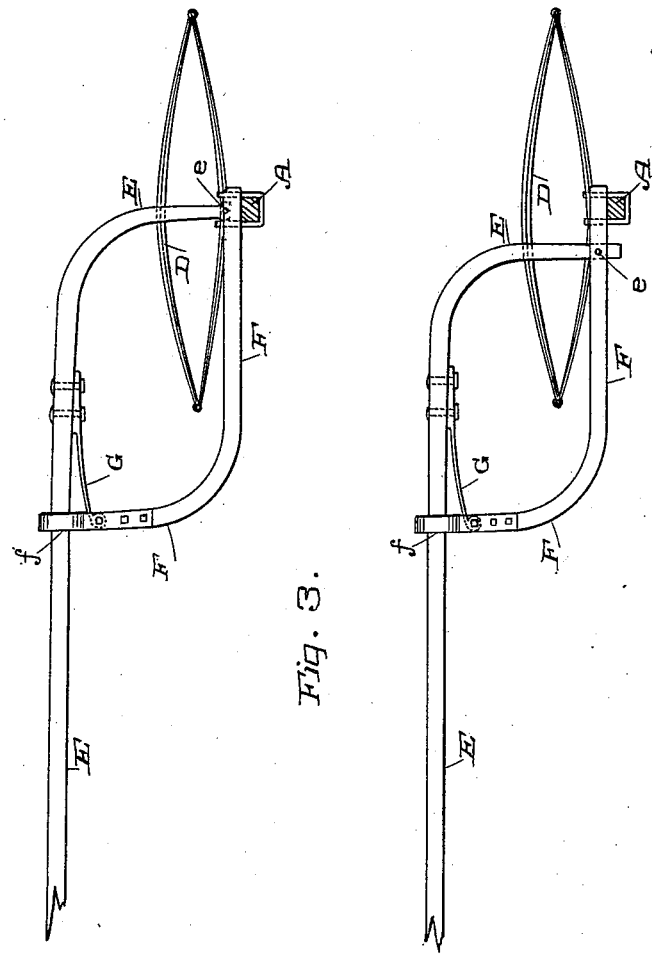
Witnesses,
Geo. H. Strong
J. H. Nurse
Inventor
Wilfred Page
By Dewey & Co.
attys

UNITED STATES PATENT OFFICE.

WILFRED PAGE, OF PENN'S GROVE, CALIFORNIA.

TWO-WHEELED VEHICLE.

SPECIFICATION forming part of Letters Patent No. 404,496, dated June 4, 1889.

Application filed November 3, 1888. Serial No. 289,917. (No model.)

*To all whom it may concern:*

Be it known that I, WILFRED PAGE, of Penn's Grove, Sonoma county, State of California, have invented an Improvement in Two-Wheeled Vehicles; and I hereby declare the following to be a full, clear, and exact description of the same.

My invention relates to that class of two-wheeled vehicles known as "carts;" and my invention consists in the novel shaft-connections hereinafter described.

The object of my invention is to overcome the unpleasant horse motion of this class of vehicles.

Referring to the accompanying drawings for a more complete explanation of my invention, Figure 1 is a side elevation of my vehicle, showing the shaft-connection at a point back of the axle. Fig. 2 is a side elevation showing the shaft-connection just over the axle. Fig. 3 is a view showing the shaft-connection forward of the axle.

A is the axle, and B is the wheel.

C is the body, and D is the body-supporting spring clipped to the axle.

E is the shaft, the rear end of which in Fig. 1 is carried over and is curved down to a point behind the axle.

F is the connecting-bar for the shaft. It is clipped solidly to the axle, as shown. Its rear end extends back of the axle, and the end of the shaft E is connected with it by a hinge or pivot joint at *e*. The forward end of the bar is curved upwardly, and is connected with the shaft by a spring G, which may be of any suitable character, (here shown as a flat spring.) A guide or eye loop *f* on the upper end of the bar loosely embraces the shaft and provides for sufficient play or movement.

The object of this construction may be briefly described as follows: There being no rigid connection of the shafts with the axle, the up-and-down movement or jogging of the horse does not effect an oscillatory movement of the axle; but the axle remains steady and no back or forward motion is communicated to the body, so that the cart rides easy and free of what is known as "horse motion."

The shafts themselves move up and down slightly about their pivots *e*; but this movement is properly limited to prevent the body from turning over by the connection of the shafts with the forward ends of the bars F, and as this connection is a yielding or spring one the slight movement of the shafts does not affect the body. In some cases the shafts need not be carried back of the axle, but may be pivoted to the bars just over the axle, as in Fig. 2; or, as in Fig. 3, they may be pivoted to said bars forward of the axle. In all these cases the general effect is about the same.

Having thus described my invention, what I claim as new, and desire to secure by Letters Patent, is—

1. In a wheeled vehicle, the axle, in combination with the bars clipped to the axle and having upwardly-curved forward ends loosely embracing the shafts, the shafts having downwardly-curved rear ends, a pivot or hinge connection between the rear ends of the shafts and the bars, and a spring-connection between the forward ends of the bars and the shafts, substantially as herein described.

2. In a two-wheeled vehicle, the axle and the shafts, in combination with connecting-bars clipped to the axle and extending in front of and behind said axle, said bars having loops or eyes which loosely embrace the shafts, a pivot or hinge connection between the rear ends of the shafts and the rear ends of the bars, and a spring-connection between the forward ends of the bars and the shafts, substantially as herein described.

3. In a two-wheeled vehicle, the combination of the axle, the shafts extending over and past the axle and having downwardly-turned rear ends, the bars clipped to and extending on each side of the axle and having upwardly-turned forward ends loosely embracing the shafts, a pivot or hinge connection between the rear ends of the shafts and bars, and a spring-connection between the forward ends of said bars and shafts, substantially as herein described.

4. In a two-wheeled vehicle, the combination of the axle, the shafts extending over and past the axle, the bars clipped to and extending on each side of the axle, a pivot or hinge connection between the rear ends of the shafts and bars, a spring-connection between the forward ends of the bars and the shafts, and guide loops or eyes on said forward ends of the bars embracing loosely the shafts, substantially as herein described.

In witness whereof I have hereunto set my hand.

WILFRED PAGE.

Witnesses:
J. C. SCOTT,
C. TEMPEL.